United States Patent
Udagawa et al.

(10) Patent No.: US 6,997,463 B2
(45) Date of Patent: Feb. 14, 2006

(54) CYLINDER HEAD GASKET

(75) Inventors: Tsunekazu Udagawa, Ichikawa (JP); Yuuichi Kinoshita, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 11/049,882

(22) Filed: Feb. 4, 2005

(65) Prior Publication Data

US 2005/0167929 A1   Aug. 4, 2005

(30) Foreign Application Priority Data

Feb. 4, 2004   (JP)   ............................ 2004-028305

(51) Int. Cl.
    *F02F 11/00*   (2006.01)
(52) U.S. Cl. .................................... 277/594
(58) Field of Classification Search ............... 277/594, 277/595, 596, 593
    See application file for complete search history.

(56) References Cited

U.S. PATENT DOCUMENTS

| | | | | |
|---|---|---|---|---|
| 4,544,169 A | * | 10/1985 | Cobb et al. | 277/595 |
| 4,677,014 A | * | 6/1987 | Bechen | 428/195.1 |
| 4,688,809 A | * | 8/1987 | Deppe | 277/594 |
| 4,759,556 A | * | 7/1988 | Udagawa | 277/595 |
| 4,815,750 A | * | 3/1989 | Yoshino | 277/595 |
| 4,998,741 A | * | 3/1991 | Udagawa | 277/595 |
| 5,094,468 A | * | 3/1992 | Hieble | 277/591 |
| 5,232,229 A | * | 8/1993 | Udagawa | 277/595 |
| 5,297,806 A | * | 3/1994 | Kestly | 277/592 |
| 5,427,389 A | * | 6/1995 | Ishikawa et al. | 277/595 |
| 5,570,892 A | * | 11/1996 | Udagawa | 277/595 |
| 5,669,614 A | * | 9/1997 | Udagawa | 277/595 |
| 5,791,659 A | * | 8/1998 | Takada et al. | 277/593 |
| 6,036,195 A | * | 3/2000 | Udagawa | 277/595 |
| 6,517,084 B1 | * | 2/2003 | Inamura | 277/592 |
| 6,769,696 B1 | * | 8/2004 | Diez et al. | 277/593 |
| 2003/0062691 A1 | | 4/2003 | Diez et al. | |

FOREIGN PATENT DOCUMENTS

DE   3425075 A1 *   1/1986

* cited by examiner

*Primary Examiner*—Alison K. Pickard
(74) *Attorney, Agent, or Firm*—Manabu Kanesaka

(57) ABSTRACT

A cylinder head gasket is provided for dealing with gas leak between cylinder bores of an engine with a reduced size and rigidity. A cylinder head gasket is formed of a single metal plate provided with beads around cylinder bores. The bead has a portion formed in a wave shape only between adjacent cylinder bores. The wave shape portions may be arranged to enter with each other. The adjacent beads may be arranged such that the wave shape portions face each other. Alternatively, the adjacent beads may have a common wave shape portion.

3 Claims, 4 Drawing Sheets

CYLINDER HEAD GASKET

BACKGROUND OF THE INVENTION AND RELATED ART STATEMENT

The present invention relates to a cylinder head gasket placed between two members such as a cylinder head and a cylinder block of an internal combustion engine.

When joint surfaces between a cylinder head and a cylinder block (cylinder body) of an automobile engine are sealed, a metal cylinder head gasket is placed between the cylinder head and the cylinder block to seal combustion gas, coolant water, and lubrication oil.

Such a cylinder head gasket has been changed from a laminated type having many layers of metal plates to a simple structure type composed of one or two metal plates for reducing a weight and production cost of an engine. Since only one or two structural plates are used, usable materials are limited for reducing a weight of an engine. A type and the number of sealing methods are limited, so that it is necessary to use a relatively simple sealing method.

As a weight and size of an engine have been reduced recently, the engine tends to have lower rigidity. Accordingly, it is difficult to obtain an even surface pressure around a cylinder bore upon sealing with the cylinder head gasket. That is, because of a structural problem around a cylinder bore, when the gasket is tightened, it is difficult to generate an enough sealing surface pressure at a low rigid portion, thereby causing gas leak at the portion.

When an engine has a smaller size in a longitudinal direction to reduce a size thereof, a space between the cylinder bores decreases, thereby increasing a temperature of the cylinder bores. As a result, the cylinder head and the cylinder block are deformed, thereby increasing a chance in which gas leaks between the cylinder bores. When a small amount of gas leaks and enters a water hole or oil hole, gas enters liquid such as water and oil, thereby causing a problem in circulating water and oil and cooling the engine. Since this causes a problem for the engine, it is necessary to provide a counter measure therefor.

Further, when a large sealing surface pressure is applied at a peripheral area just around a cylinder bore to ensure bore sealing performance, a deformation of a cylinder bore with low rigidity is promoted. Accordingly, a sealing member of a gasket does not function properly, and it is difficult to obtain good bore sealing performance.

A metal gasket with beads formed around cylinder bores (combustion chamber holes) has been proposed. The beads are connected or cross between the cylinder bores, and have straight portions between the cylinder bores. It has been proposed that an edge of the bead at a side of the cylinder bore is formed in a curved shape for smoothly connecting the straight portions between the cylinder bores and arc portions around the cylinder bores except the straight portions (see Patent Reference 1).

With this structure, a decrease in the surface pressure at the bead crossing section is prevented for small cylinder bores of a small engine. Also, a portion in which rigidity of the bead changes greatly around the bead crossing section is eliminated, thereby preventing gas leak at the bead crossing section.

However, in such a single bead structure with the straight portion, it may not be an enough solution for an increased temperature of the cylinder bore and lower rigidity of a recent engine.

Further, a portion between the cylinder bores is very small as compared with other portions, and a gasket may be formed of a single or two metal plates. Accordingly, only a limited sealing member can be disposed. As a result, it is difficult to combine complex sealing members. Even though it is possible, a number of production steps increases, thereby increasing production cost.

One of the inventors has proposed a metal gasket for an internal combustion engine. A bead with a wave shape in a plan view is provided around a liquid hole where it is difficult to obtain an enough sealing surface pressure, thereby securely sealing around the liquid hole (see Patent Reference 2).

Patent Reference 1: Japanese Patent Publication (Kokai) No. 2000-356266

Patent Reference 2: Japanese Patent No. 3026084

In view of the problems described above, an object of the present invention is to provide a cylinder head gasket for effectively preventing gas leak between cylinder bores of an engine with a small size and low rigidity.

Further objects and advantages of the invention will be apparent from the following description of the invention.

SUMMARY OF THE INVENTION

In order to attain the objects described above, according to the present invention, a cylinder head gasket is formed of one metal plate having a bead around a cylinder bore or laminated metal plates having a metal plate with a bead. The bead has a portion with a wave shape in a plan view located between the cylinder bores.

With this structure, the bead has the portion with a wave shape located between the cylinder bores, thereby increasing a length of the bead. When the gasket is tightened, the bead receives a surface pressure at an increased area. As a result, as compared with a conventional gasket without the wave shape portion, it is possible to reduce creep relaxation at the portion. Accordingly, it is possible to maintain high sealing performance between the cylinder bores where a temperature is high and it is difficult to seal, thereby improving sealing performance with the structure.

In the cylinder head gasket, the wave shape portion of the bead may be arranged to face a wave shape portion of an adjacent bead. That is, the wave shape portions of the two adjacent beads are arranged symmetrically relative to a center line therebetween.

Alternatively, the wave shape portions of the two adjacent beads may be arranged to enter with each other. That is, the wave shape portions extend in parallel.

Alternatively, the wave shape portions of the two adjacent beads may be arranged to have a common wave shape portion. That is, the adjacent beads cross or are connected at a portion between the cylinder bores to form the common wave shape portion.

In the present invention, the seal bead around the cylinder bores is typically formed of a full bead with an arc shape, and may be formed of a full bead with a trapezoid shape and the like. Alternatively, the bead may be formed of a half bead other than the full bead. The wave shape portion is not limited to a specific shape, and may have a continuous curved shape such as an arc, or a continuously bent straight lines such as a series of triangles or trapezoids.

In the present invention, the bead has the wave shape portion located between the cylinder bores for receiving a surface pressure at an increased bead area. Accordingly, the bead can withstand high tightening pressure and has good sealing performance with high creep relaxation resistance. It is possible to effectively prevent gas leak between the cylinder bores of a recent engine with a small size and low rigidity.

DETAILED DESCRIPTION OF PREFERRED EMBODIMENTS

Hereunder, a cylinder head gasket according to the embodiments of the present invention will be described in detail with reference to the attached drawings.

Cylinder head gaskets 1, 1A and 1B according to the embodiments of the present invention shown in FIGS. 1 to 4 are metal gaskets placed between a cylinder head and a cylinder block (cylinder body) for sealing combustion gas with a high pressure and high temperature and fluid such as coolant water and oil in a coolant passage and cooling oil passage.

FIGS. 1 to 4 are schematic explanatory views in which aspect ratios of the cylinder head gaskets 1, 1A and 1B in a plan view, and numbers, widths, and aspect ratios of wave shapes of the beads are different from actual ones for the sake of explanation.

Figure 1:
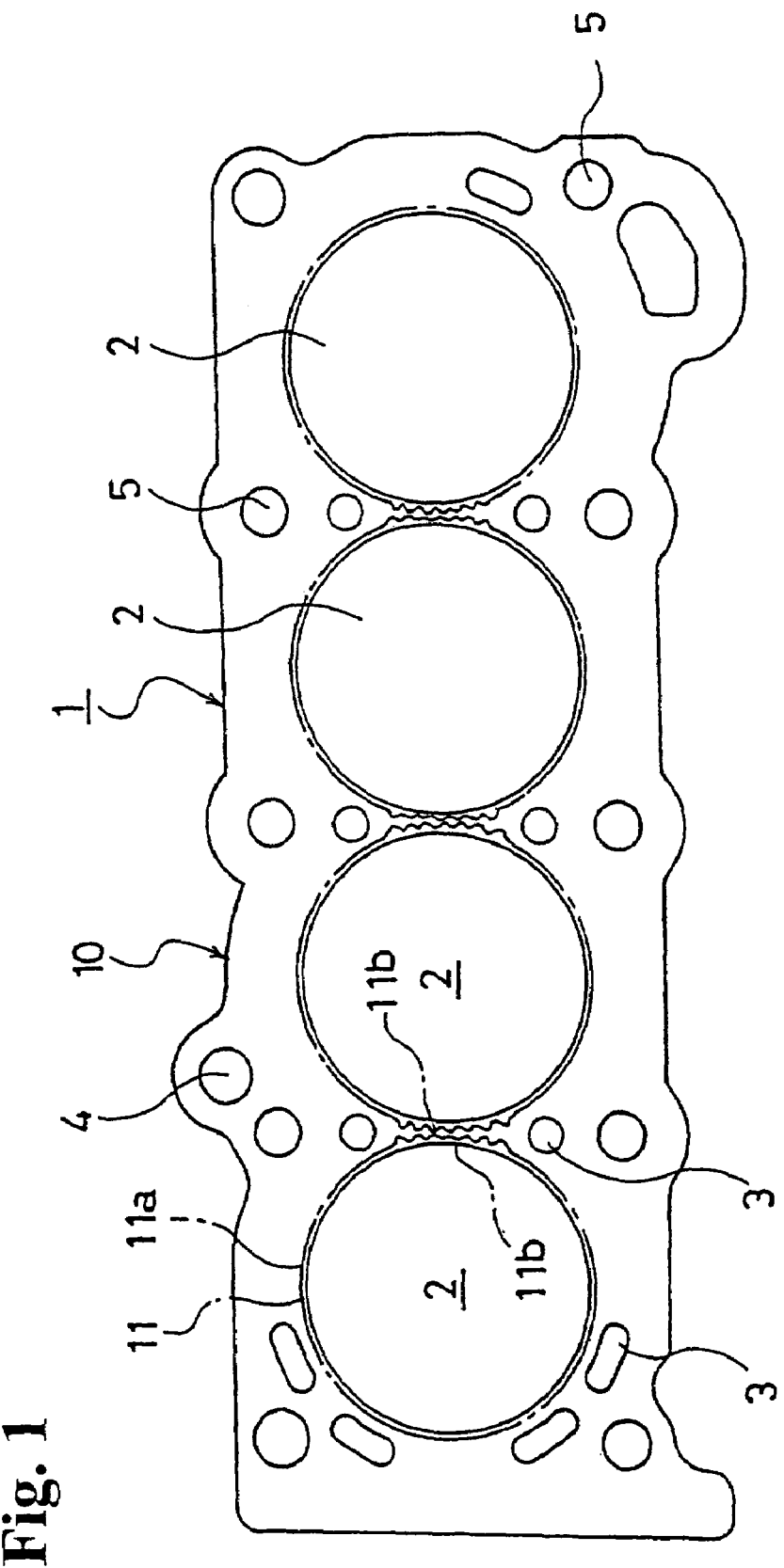
FIG. 1 is a plan view of a cylinder head gasket according to a first embodiment of the present invention.
Figure 2:
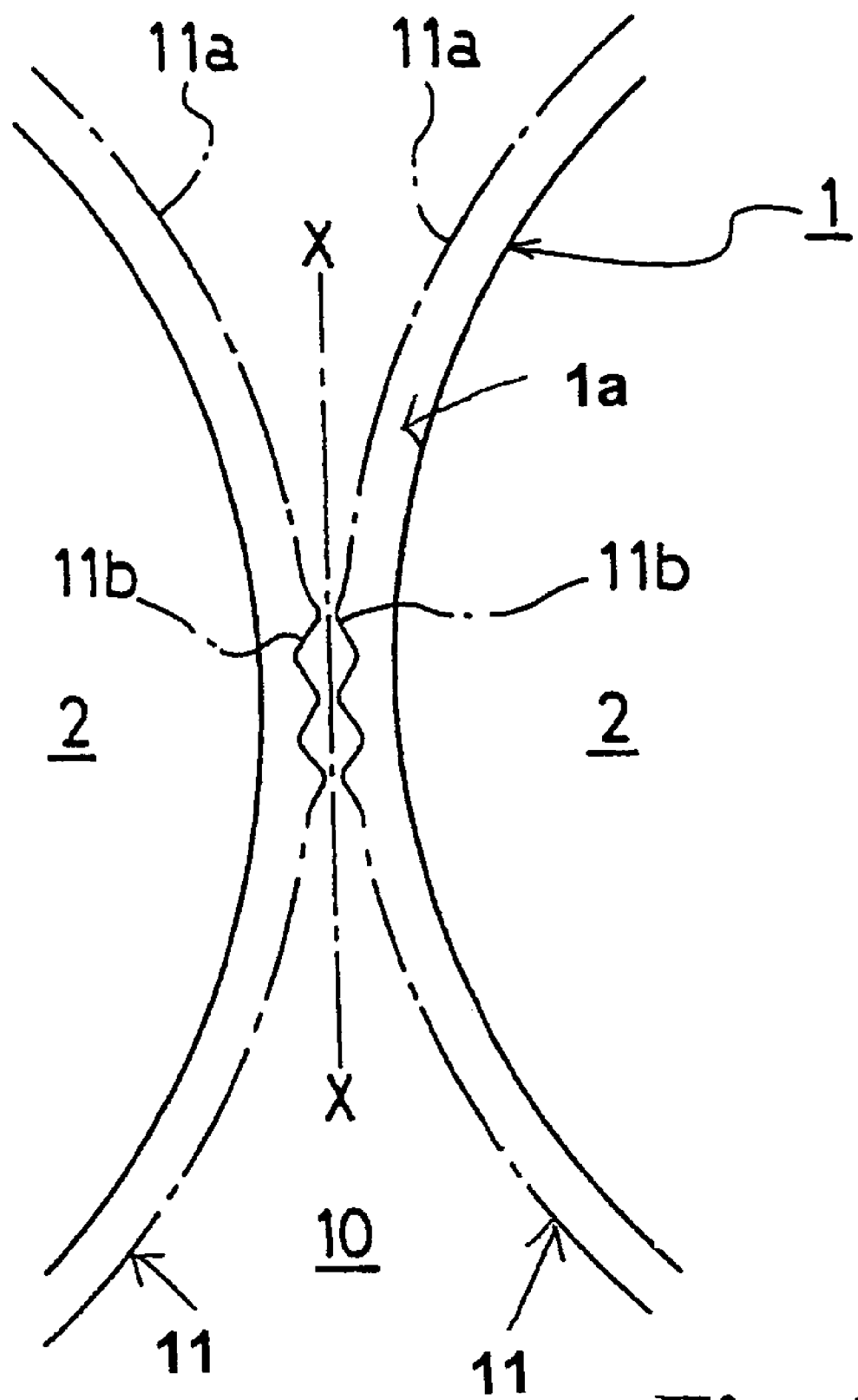
FIG. 2 is an enlarged view of an area between the cylinder bores showing a structure of the cylinder head gasket according to the first embodiment of the present invention.

According to a first embodiment, the cylinder gasket 1 shown in FIGS. 1 and 2 is formed of a single sheet of a metal plate 10. The metal plate 10 is made of annealed stainless steel (annealed material), or soft steel, and is formed in a shape corresponding to a shape of an engine part such as a cylinder block. The metal plate 10 is provided with cylinder bores 2, coolant water holes 3, oil holes 4 for circulating oil, and bolt holes 5 for tightening bolts. Beads 11 formed of full beads are arranged around the cylinder bores 2 as sealing means.

The beads 11 encircle the cylinder bores 2, respectively. In the first embodiment, as shown in FIGS. 1 and 2, the bead 11 has a portion 11a other than a portion 1a between the cylinder bores 2 formed in an arc shape along the cylinder bore 2 in a plan view. Only the portion located between the cylinder bores 2 is formed in a wave shape. Further, a wave shape portion 11b is arranged to face a wave shape portion of an adjacent bead 11. That is, the wave shape portion of the adjacent bead 11 is formed symmetrically relative to a center line X—X. With this structure, it is possible to generate a sealing surface pressure in a wide area.

Figure 3:
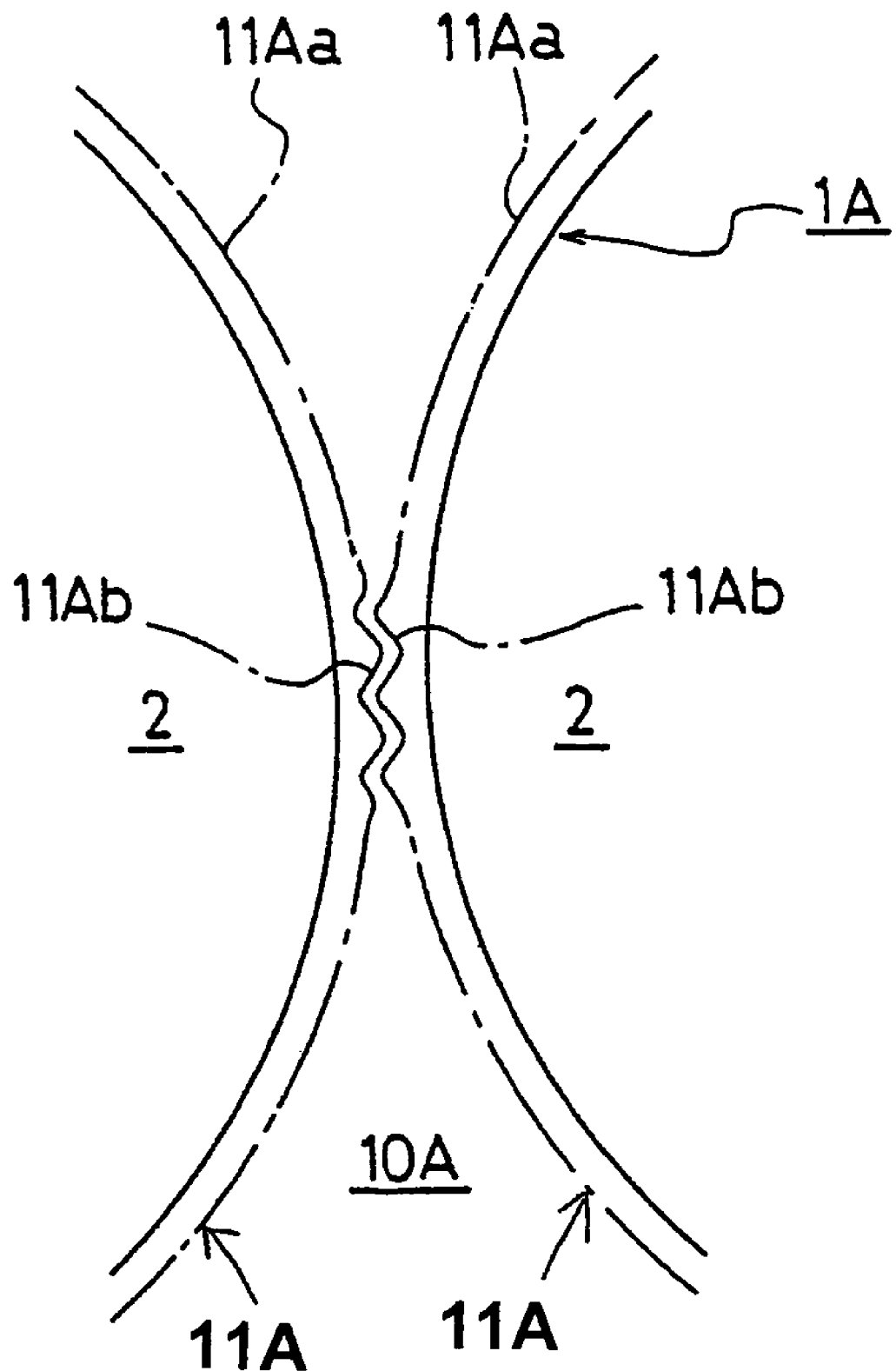
FIG. 3 is an enlarged view of an area between the cylinder bores showing a structure of the cylinder head gasket according to a second embodiment of the present invention.

In a second embodiment, as shown in FIG. 3, beads 11A encircle the cylinder bores 2 formed in a metal plate 10A. The bead 11A has a portion 11Aa other than the portion between the cylinder bores 2 formed in an arc shape along the cylinder bore 2 in a plan view. Only the portion between the cylinder bores 2 is formed in a wave shape. Further, a wave shape of the wave shape portion 11Ab is arranged to enter a wave shape portion of an adjacent bead 11A. That is, the wave shape portions of the adjacent beads 11A are arranged generally parallel to each other.

With the structure of the cylinder head gasket 1A according to the second embodiment, it is possible to provide the wave shape portions 11Abof the beads 11A for the adjacent cylinder bores even when the portion between the cylinder bores 2 is small.

Figure 4:
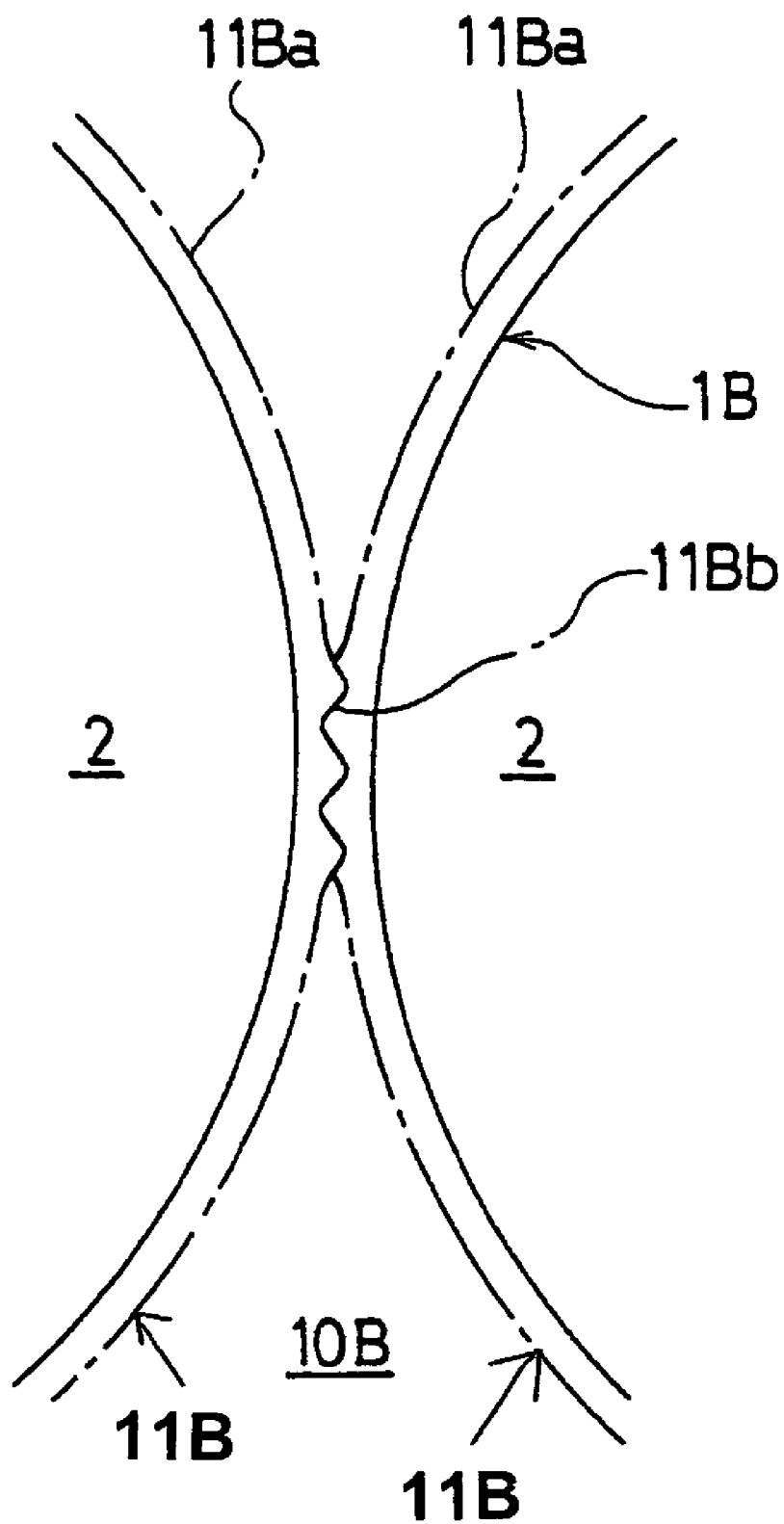
FIG. 4 is an enlarged view of an area between the cylinder bores showing a structure of a cylinder head gasket according to a third embodiment of the present invention.

Further, in a third embodiment, as shown in FIG. 4, beads 11B encircle the cylinder bores 2 formed in a metal plate 10B. The bead 11B has a portion 11Ba other than the portion between the cylinder bores 2 formed in an arc shape along the cylinder bore 2 in a plan view. Only the portion between the cylinder bores 2 is formed in a wave shape. Further, a wave shape portion 11Bb is formed as a common wave shape portion 11Bb relative to the adjacent bead 11B. That is, the adjacent beads 11B cross and are connected at the portion between the cylinder bores 2 to form the common wave shape portion 11Bb.

The structure of the cylinder head gasket 1B according to the third embodiment is suitable for a case in which the portion between the cylinder bores 2 is extremely small.

The seal beads 11, 11A and 11B around the cylinder bores 2 are typically formed of a full bead with an arc shape, but not limited thereto. The beads may be formed of a full bead with a trapezoid shape and the like. Alternatively, the beads may be formed of a half bead other than the full bead. The wave shape portions 11b, 11Ab and 11Bb are not limited to a specific wave shape, and may have a continuously curved shape such as an arc, or continuously bent straight lines such as a series of triangles or trapezoids.

In the cylinder head gaskets 1, 1A and 1B according to the first to third embodiments, the beads 11, 11A, and 11B have the wave shape portions 11b, 11Ab, and 11Bb located between the cylinder bores for receiving a surface pressure at an increased area. Accordingly, the beads can withstand high tightening pressure and have good sealing performance with high creep relaxation resistance.

Accordingly, the cylinder head gasket can withstand high tightening pressure and have good sealing performance with high creep relaxation resistance. It is possible to generate the sealing surface pressure at a wide area, thereby securely sealing the cylinder bores.

In the embodiments, the cylinder head gasket is the single metal plate cylinder head gasket formed of a single sheet of the metal plate. According to the present invention, the cylinder head gasket may be a laminated metal cylinder head gasket formed of a plurality of metal plates.

The disclosure of Japanese Patent Application No. 2004-028305, filed on Feb. 4, 2004, is incorporated in the application.

While the invention has been explained with reference to the specific embodiments of the invention, the explanation is illustrative and the invention is limited only by the appended claims.

What is claimed is:

1. A cylinder head gasket comprising:
    at least one metal plate having a plurality of cylinder bores, and at least one intermediate portion located between two adjacent cylinder bores, and
    beads formed in the metal plate around the respective cylinder bores, each of said beads being formed independently around the respective cylinder bores and having a wave shape portion formed in only the intermediate portion between the two adjacent cylinder bores, and a smooth bead portion extending from the wave shape portion and formed around the cylinder bore except for the wave shape portion, said wave shape portion extending in lateral direction and having head portions changing extending directions of the bead and facing the adjacent cylinder bores, wherein said wave shape portions of the beads are arranged symmetrically relative to a center line extending through the intermediate portion so that the head portions of the beads face each other.

2. A cylinder head gasket comprising:

at least one metal plate having a plurality of cylinder bores, and at least one intermediate portion located between two adjacent cylinder bores, and beads formed in the metal plate around the respective cylinder bores, each of said beads being formed independently around the respective cylinder bores and having a wave shape portion formed in only the intermediate portion between the two adjacent cylinder bores, and a smooth bead portion extending from the wave shape portion and formed around the cylinder bore except for the wave shape portion, said wave shape portion extending in lateral direction and having head portions changing extending directions of the bead and facing the adjacent cylinder bores, wherein said wave shape portions of the beads are arranged away from each other substantially equally throughout entire lengths thereof to partly overlap with respect to each other.

3. A cylinder head gasket comprising:

at least one metal plate having a plurality of cylinder bores, and at least one intermediate portion located between two adjacent cylinder bores, and beads formed in the metal plate around the respective cylinder bores, each of said beads having a wave shape portion formed in only the intermediate portion between the two adjacent cylinder bores, and a smooth bead portion extending from the wave shape portion and formed around the cylinder bore except for the wave shape portion, said wave shape portion extending in lateral direction and having head portions changing extending directions of the bead and facing the adjacent cylinder bores, wherein said wave shape portions of the beads located adjacent to each other are joined to form one common wave shape portion so that the smooth bead portions of the beads extend from the one common wave shape portion.

* * * * *